United States Patent [19]
Ho et al.

[11] Patent Number: 6,128,353
[45] Date of Patent: Oct. 3, 2000

[54] CODE DIVISION MULTIPLE ACCESS SYSTEM WITH DYNAMIC HISTOGRAM CONTROL

[75] Inventors: Kenneth Yiu-Kwong Ho, Neshanic; Kenneth W. Parker, Rockaway, both of N.J.

[73] Assignee: Lucent Technologies, Inc., Murray Hill, N.J.

[21] Appl. No.: 08/889,073

[22] Filed: Jul. 7, 1997

[51] Int. Cl.[7] .................................................. H04L 27/08
[52] U.S. Cl. ...................... 375/345; 375/147; 375/332; 330/278; 329/304
[58] Field of Search .................................. 375/345, 140, 375/147, 148, 332; 329/304; 455/219, 220; 330/278

[56] References Cited

U.S. PATENT DOCUMENTS

| 4,335,361 | 6/1982 | Acker | 330/285 |
| 4,864,244 | 9/1989 | Sasaki | 329/304 |
| 5,029,182 | 7/1991 | Cai et al. | 375/202 |
| 5,051,903 | 9/1991 | Pelc et al. | 324/309 |
| 5,508,706 | 4/1996 | Tsou et al. | 342/192 |
| 5,566,213 | 10/1996 | Carsello | 375/344 |
| 5,596,605 | 1/1997 | Kiyanagi et al. | 375/326 |

*Primary Examiner*—Young T. Tse
*Attorney, Agent, or Firm*—Henry I. Schanzer

[57] ABSTRACT

Circuits embodying the invention include a baseband amplifier to whose input is applied a baseband input signal (I or Q). The gain of the amplifier is controlled by sampling the output of the amplifier and supplying the sampled signals to a dynamic histogram control (DHC) circuit which includes a memory circuit for storing a histogram which contains a statistically expected response of the sampled baseband signal. The DHC circuit includes circuitry for comparing the sampled signals to the stored histogram for producing a gain control signal which is then used to control the gain of the amplifier. In some embodiments, the DHC circuit may also include circuitry for producing an offset adjustment signal to control the direct current (dc) level of the signal being sampled and hence its symmetry.

31 Claims, 9 Drawing Sheets

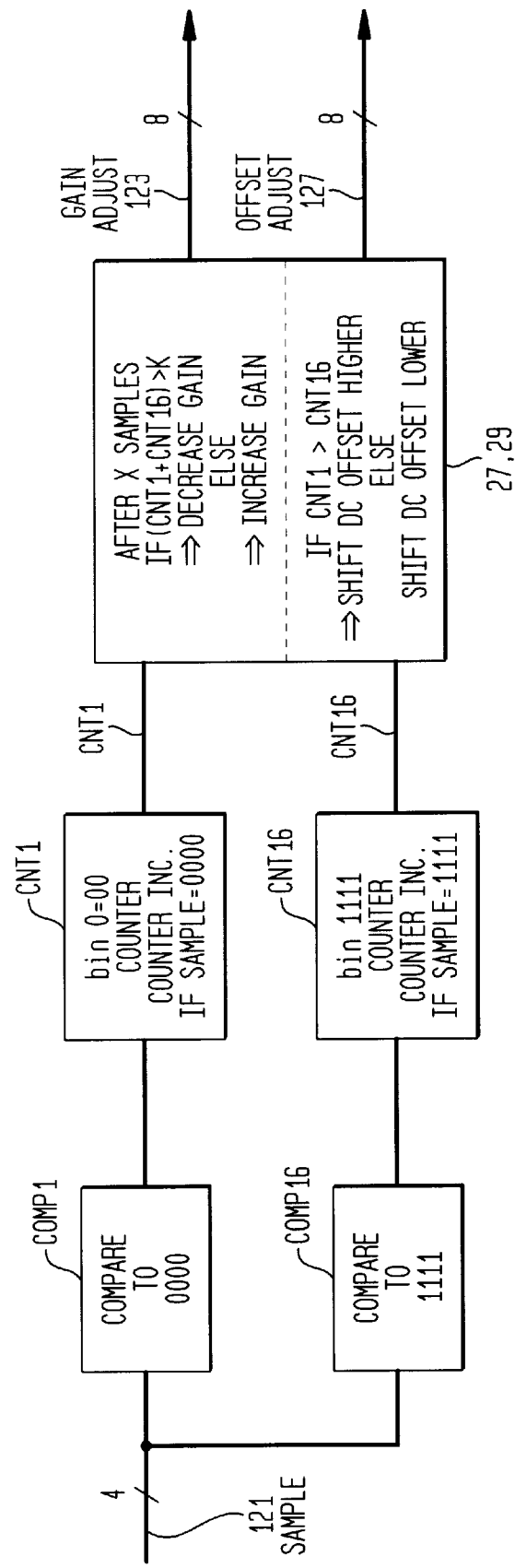

CODE DIVISION MULTIPLE ACCESS SYSTEM WITH DYNAMIC HISTOGRAM CONTROL

BACKGROUND OF THE INVENTION

This invention relates to a code division multiple access (CDMA) system and, in particular, to an automatic gain control (AGC) loop for a CDMA system.

CDMA systems intentionally combine a large number of different transmissions on the same channel at the same time. CDMA allows the different transmissions to interfere with each other in a controlled fashion. Although signals from different transmissions are combined on the same channel, the information of each transmission is recoverable because each transmission is subjected to a special additional level of encoding before it is sent. Each transmitter has its own unique code and it imparts an extra level of its unique coding on each signal transmission being transmitted. Therefore, although many different transmissions are combined at the receiving end, each transmission maintains the unique signature (coding) imparted to that transmission. The receiver, in turn, "knows" the unique code of the signal it is looking for, and by applying this code as a kind of filter to the stream of radio energy in the channel, it can recover the desired signal from the background of all the other signals.

To keep the power levels constant and the dynamic range of the CDMA system as high as possible the analog portion of the CDMA system processing the received analog CDMA signals requires the use of an automatic gain control (AGC) circuit.

Due to the nature of wireless transmission over the air and the activity of different users transmitting on the same channel the received signal power will have a very large dynamic range, for example 50 dB. In order to have circuitry which can reasonably process received signals which have such a large dynamic range, the received signal must go through some sort of automatic gain control (AGC) circuitry to narrow down the fluctuation before the received signal is applied to circuitry which is used to process the signal and to extract information from the signal. It should be noted that the power of the received signal does not carry information. This explains why information is not lost when the power is adjusted using an AGC circuit.

To better utilize the hardware processing the received signal, it is desirable that the AGC circuit maintain the power of the received signal as constant as possible. This is particularly so at the interface between the AGC circuit and a subsequent analog-to-digital converter (ADC). In order to maintain the power constant with a high degree of accuracy there are two sources of power fluctuation which have to be dealt with. One is the very rapid fluctuation resulting from the power dynamic range in air due to multi-path fading, constant movement of the transmitter (mobile) relative to the receiver (cell-site) and similar conditions. The second is a very slow fluctuation due to temperature changes, component aging, cable loss, and other component inaccuracies. It would be very expensive and difficult to create a single AGC circuit to deal with these two sources of fluctuation. Instead, as shown in FIG. 1A, it is more feasible to use two stages of AGC circuitry. The first stage of AGC is used to perform, fast and gross adjustments which bring the power level down to a narrow range. The second AGC stage is used to perform slow and fine adjustments to bring the power level to a level which is equal to an ideal level.

A second AGC stage for processing CDMA signals in accordance with the prior art is of the type shown in FIG. 1B.

FIG. 1B illustrates a system in which a power sensing module is used to sense and control the gain of a baseband amplifier. In response to an analog input signal, a demodulator 6 produces an in-phase (I) and a quadrature (Q) signal which are respectively applied to baseband amplifiers (8a, 8b). The power level of the signal at the outputs of amplifiers 8a and 8b is sensed by means of power sensing (9a, 9b) modules which are used to control the gain of the baseband amplifiers. To implement the second stage of the AGC circuit requires a module to sense the power of the received signal very accurately and to make a slow adjustment to the baseband amplifier. The power sensing module (9a, 9b) is required to perform an accurate power metering function and is generally a very expensive and complex analog circuit. The module will constantly monitor the input power and will decrease or increase the gain of the baseband amplifier as a function of whether, or not, the power measured over a last preceding fixed interval exceeds a target point.

However, the circuit of FIG. 1B and similar circuits suffer from some problems. It is very difficult and expensive to implement analog circuitry to sense power accurately over a wide temperature range. Analog components tend to be inaccurate and are subject to aging factors. In a CDMA system, the goal of the system is to process the received signal and generate a fixed statistical histogram of the sampled input signal. In accordance with the prior art scheme, discussed above, the system is designed to maintain a fixed power level. This is an indirect way of trying to obtain an ideal statistical histogram. Moreover, maintaining the power level within a fixed range does not ensure that the sampled digital data will yield an ideal histogram due to the inaccuracy in the AGC conversion circuit.

SUMMARY OF THE INVENTION

Applicants' invention resides, in part, in the recognition that available histogram information which may be, for example, an idealized statistically expected received signal, can be used for dynamic histogram control (DHC).

Applicants' invention also resides in the use of the histogram information to control an AGC loop.

Applicants' invention also resides in the use of the histogram information to control the gain of a baseband amplifier.

Applicants' invention also resides in circuitry for adjusting certain offsets to correct for asymmetry in the received signal.

In a circuit embodying the invention, a baseband signal is applied to the input of an amplifier. The output of the amplifier is sampled via an analog-to-digital converter (ADC) and the output of the ADC is applied to a dynamic histogram control circuit which stores a histogram containing a statistically expected response of the baseband signal. The output of the ADC is compared to the contents of the histogram for producing a control signal which is applied to the control terminal of the amplifier for controlling its gain.

BRIEF DESCRIPTION OF THE DRAWINGS

In the accompanying drawings like reference characters denote like components.

FIG. 6B is a more detailed diagram of a portion of FIG. 6A;

DETAILED DESCRIPTION OF THE INVENTION

Based on various experimental and statistical results a histogram of the type shown in FIG. 2A may be developed to indicate what the "ideal" or "expected" statistical response of the amplitude of a received baseband signal should look like and contain, in a CDMA circuit. This histogram is for purpose of illustration and it should be evident that many different responses may exist.

For ease of illustration, the histogram for the in-phase (I) baseband signals is assumed to be the same as the histogram for the quadrature (Q) baseband signals. However, it should be understood that the I and Q baseband signals could have different histograms. In any event, it is assumed that an ideal histogram of a signal to be received is available. In circuits and systems embodying the invention, this is the standard (reference) against which a received signal is to be compared and to which it is adjusted.

Figure 1A:
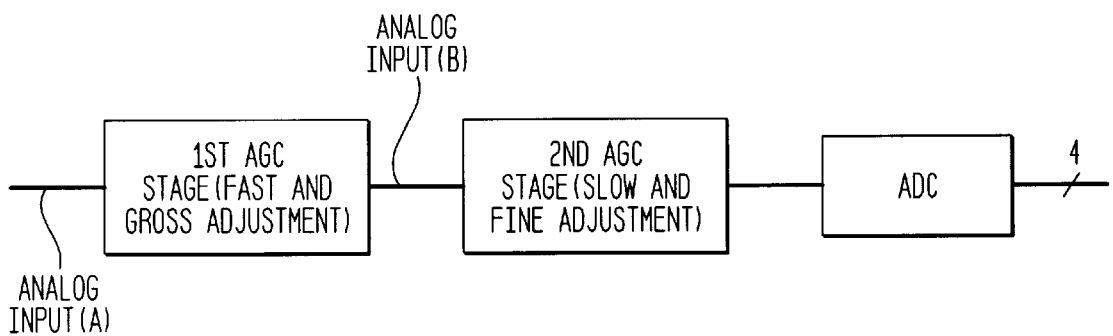
FIG. 1A is a block diagram of two stages of automatic gain control (AGC) circuitry used in prior art systems.
Figure 1B:
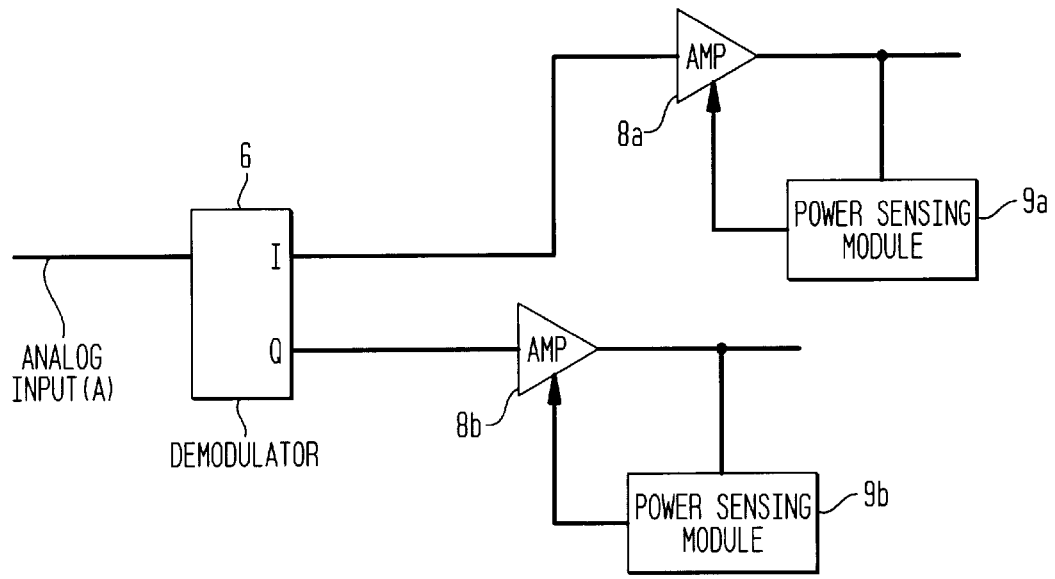
FIG. 1B is a block diagram of a prior art AGC loop used in one of two stages of a prior art system.
Figure 2:
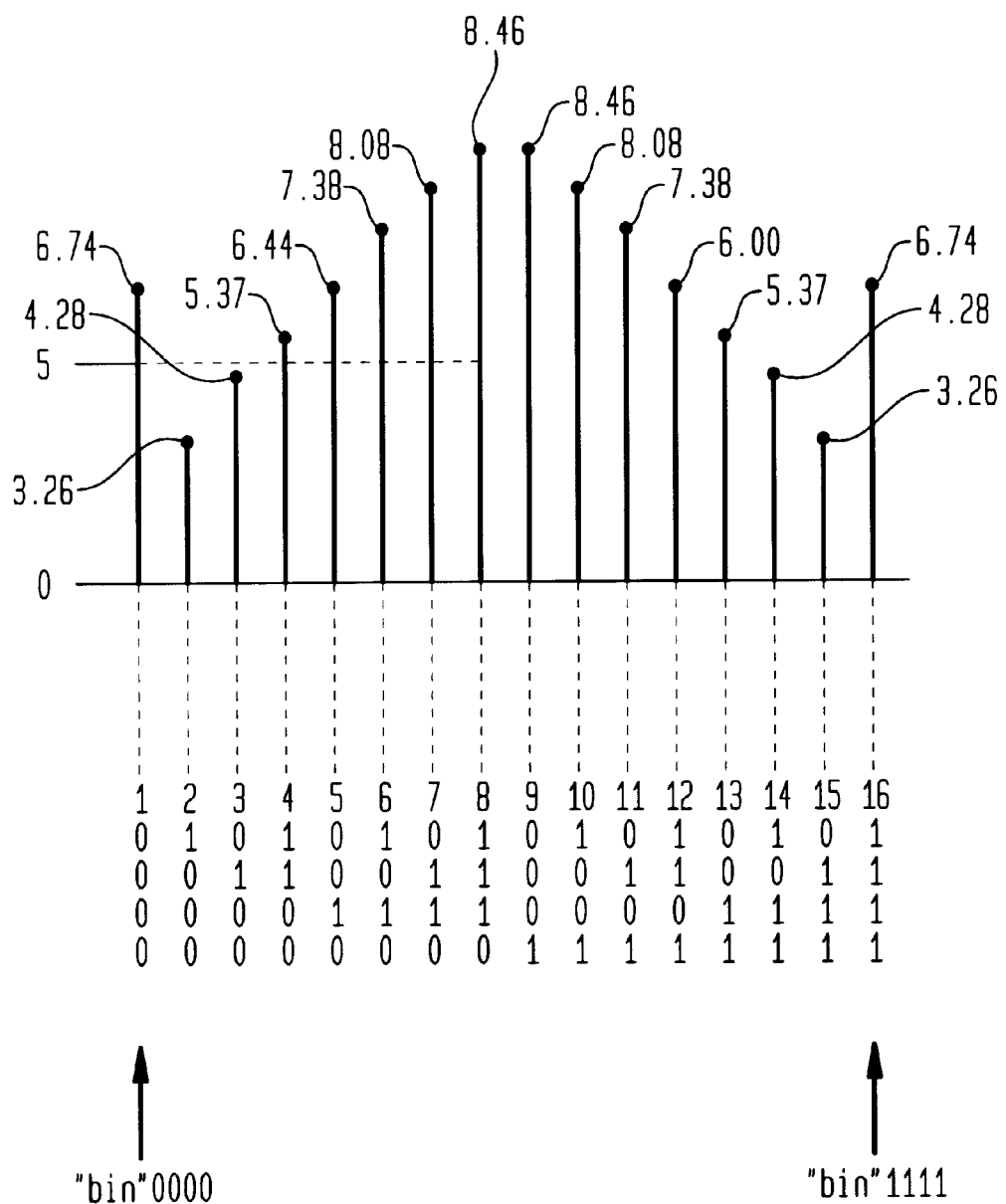
FIG. 2 is a histogram of an "idealized" response of a sampled baseband signal divided into levels or "bins"

FIG. 2 is a histogram divided into 16 sections (0000 to 1111) showing the "expected" or "idealized" amplitude response of the sampled signals and, as to each section, also referred to as a level or "bin", the percentage of signal samples to be expected in each level (or bin) out of the total number of signal samples sampled during a given interval. By way of example, referring to the first two sections and the last two sections of FIG. 2, note that for a given number of samples in any given interval:

(a) 6.74% of the samples should have an amplitude of 0000 and 6.74% of the samples should have an amplitude of 1111; and (b) 3.26% of the samples should have an amplitude of 1000 and 3.26% should have an amplitude of 0111.

The percentage of samples within each level may be obtained by referring to FIG. 2. As detailed below, this "expected" or "ideal" histogram information is stored in a memory circuit located in a dynamic histogram control circuit 122. The memory circuit may be any one of a number of read only memories (ROMs) or any one of a number of random access memories (RAMs).

Figure 3:
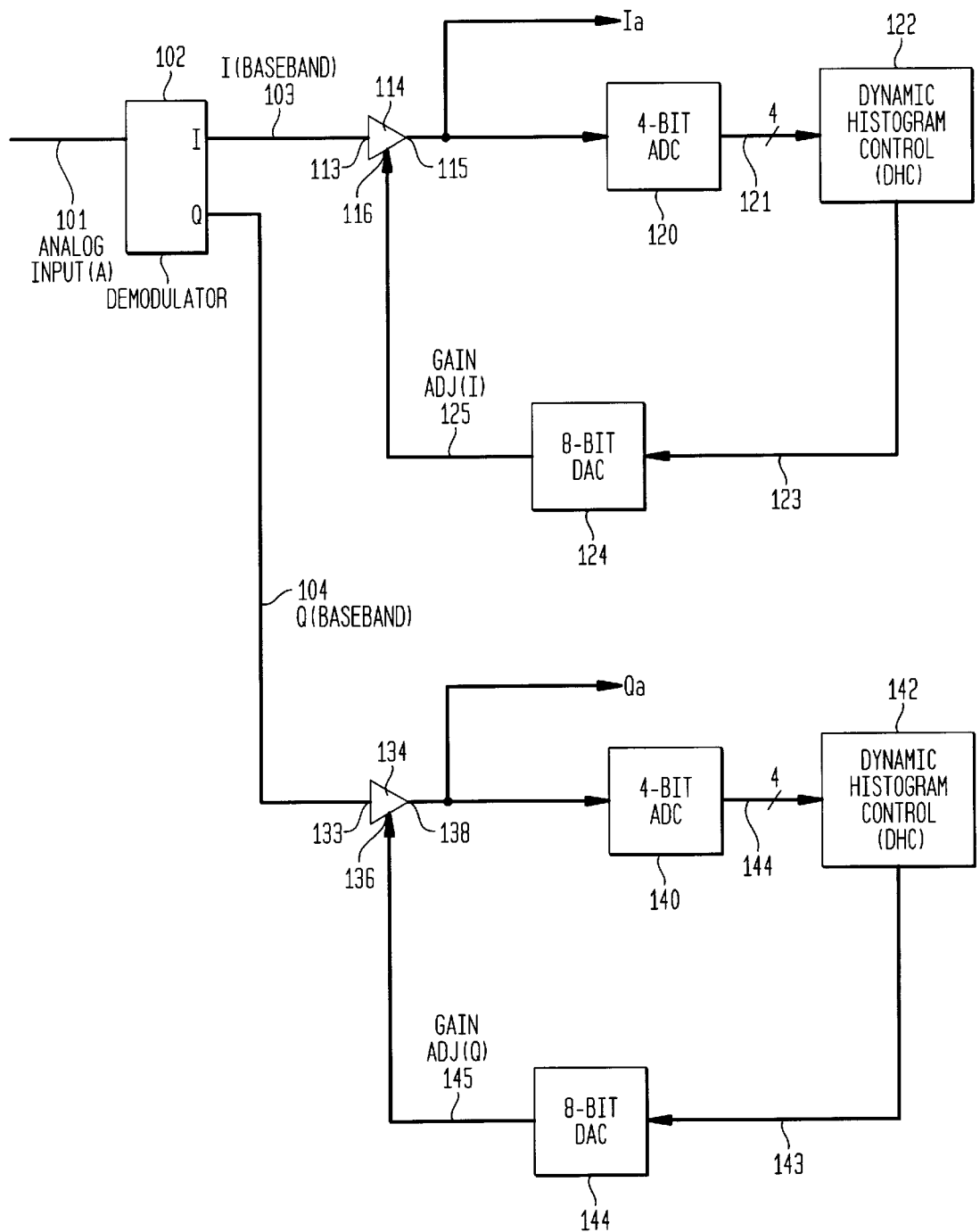
FIG. 3 is a block diagram of a portion of a CDMA circuit with an AGC loop embodying the invention.

The circuit of FIG. 3 illustrates an AGC loop in a CDMA system in accordance with the invention. An rf signal (or a corresponding analog input) present on line 101 is applied to the input of a demodulator 102 which may be any one of a number of known demodulators.

The demodulator 102 produces an in-phase (I) baseband signal on output line 103 and a quadrature (Q) baseband signal on output line 104. The I signal is applied to the input 113 of an amplifier 114 having an output 115 and a control input 116. Amplifier 114 may be any suitable operational amplifier, e.g., an AD 828 manufactured by the Analog Devices Company. The output (Ia) of amplifier 114 is applied to the input of a 4-bit analog-to-digital converter (ADC) 120 whose output is applied via lines 121 to a dynamic histogram control (DHC) circuit 122.

Figure 4A:
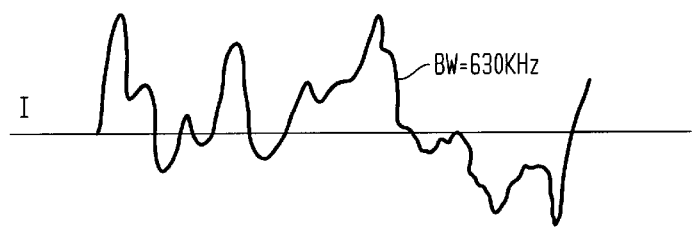
FIGS. 4A and 4B are waveform diagrams of signals at the input and output of the baseband amplifier.
Figure 4B:
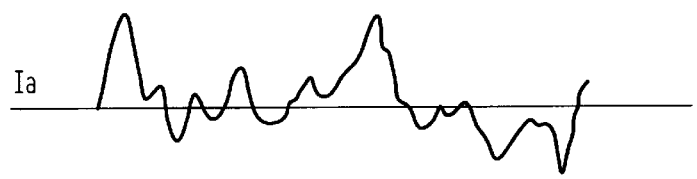
Figure 4C:
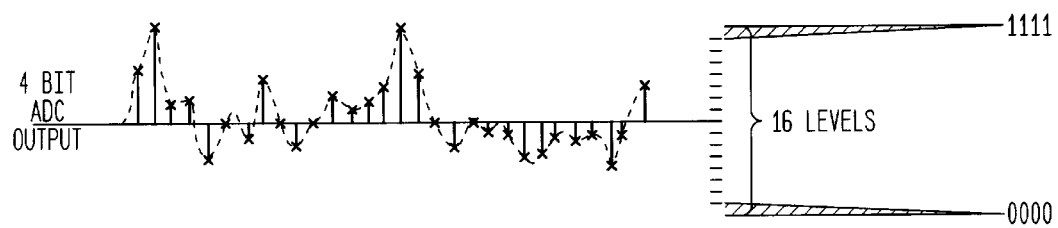
FIG. 4C is a waveform diagram of samples corresponding to the signals of FIGS. 4A and 4B produced at the output of an analog-to-digital converter (ADC)

By way of example, the I baseband signal applied to the input of amplifier 114 may be of the type shown in FIG. 4A. This I-signal has a base frequency range of one KHz to 630 KHz and normally has (or should have) a Gaussian distribution with specific standard deviation. In response to the I-baseband input signal of FIG. 4A, amplifier 114 produces an Ia signal at its output which may have the form shown in FIG. 4B. By way of example, FIG. 4B illustrates the output obtained from amplifier 114 when the instantaneous gain of amplifier 114 is about 0.7 for the selected period shown. The signal present at the output of amplifier 114 is applied to, and sampled by, ADC 120. The amplitude of each sample is converted into a four bit signal. FIG. 4C illustrates the result of sampling the waveform shown in FIG. 4B and that the amplitude of each sample may fall in any one of 16 levels. A sampled signal whose maximum amplitude places it in a certain level is then assigned a 4-bit digital value corresponding to that level. In practice, the Ia signal is sampled at a rate of more than 9 MHz (actually 9.8304 MHz). Sampling circuitry is well known and need not be detailed.

Figure 5A:
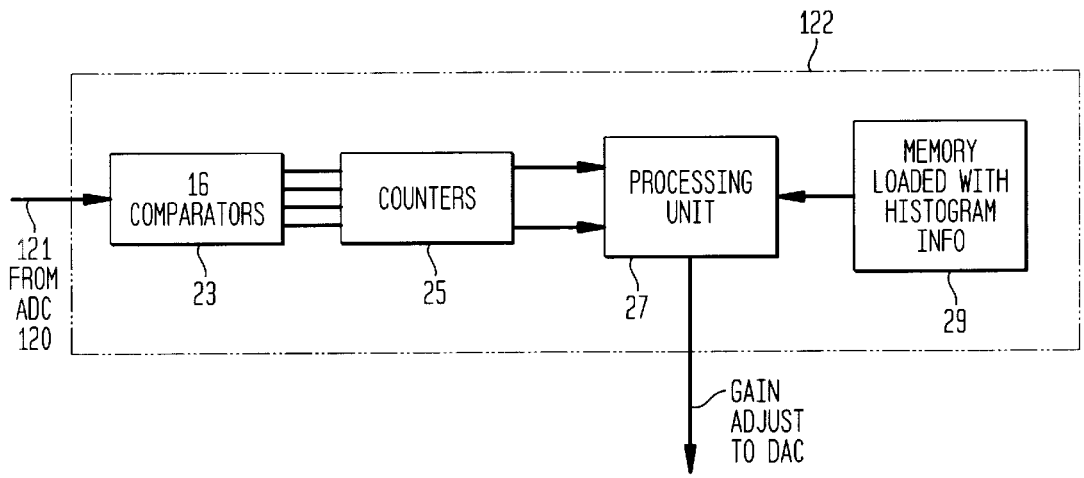
FIG. 5A is a block diagram of a portion of a dynamic histogram control (DHC) circuit embodying the invention.

In the circuit of FIG. 3, each input signal sampled by ADC 120 is converted into a corresponding 4 bit digital signal ranging from 0000 to 1111. The 4 bit outputs from ADC 120 are applied to DHC 122, parts of which are detailed in FIGS. 5A and 5B. As shown in FIG. 5A, DHC 122 includes a bank of comparators 23 for receiving and processing the 4 bit sampled signal at the output of ADC 120. The bank of comparators 23 are coupled to a corresponding bank of counters 25. The outputs from the counter 25 are applied to a processing unit 27 which includes, or is arranged to receive, histogram information stored in a memory 29. That is, the memory array 29 storing the histogram information may be part of the processing units or may be a separate storing circuit. In this example, the microprocessor 27 is programmed to tabulate the contents of the bank of contents 25, compare their contents to each other, compare their contents to the histogram information and perform calculations to produce at its output an 8 bit gain adjust signal which is applied to an 8 bit DAC 124 (See FIG. 3).

Figure 5B:
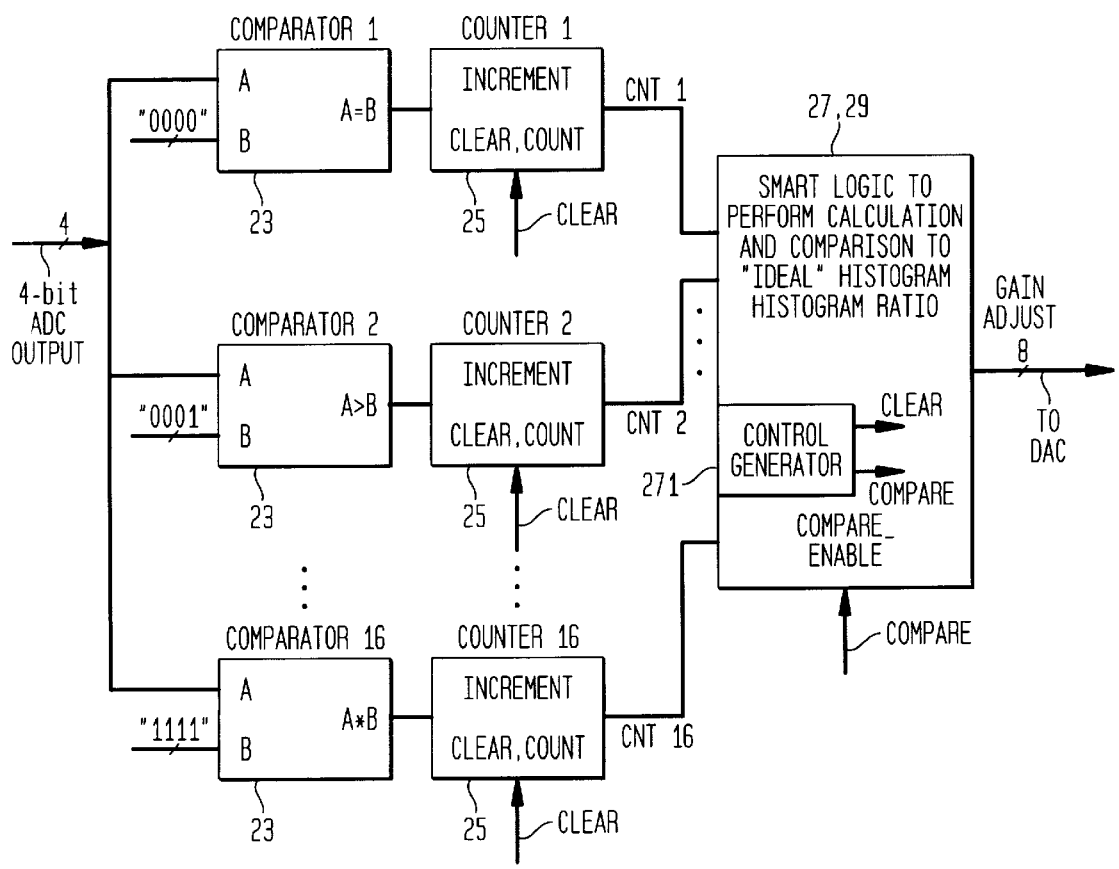
FIG. 5B is a more detailed block diagram of the circuit of FIG. 5A.

Part of the operation of DHC 122 may be explained with reference to FIG. 5B.

a The system is arranged so that at a selected time the signal at the output of amplifier 114 is sampled via ADC 120. A sampling interval is set and during each sampling interval, X data samples will be taken from ADC 120 and, after processing via comparator bank 23, will be stored in counter bank 25. For purpose of illustration assume X to be 2000, but, X may range from 1000 (or less) to 10,000 (or more). The greater the number of samples that are taken the better is the statistical estimation, but the slower is the response time and the adjustment. Each sampling (or collection) interval may be initiated by a "clear" pulse (produced by a control generator 271) which is applied to the counter bank 25, as shown in FIG. 5B.

b In the embodiment shown in FIGS. 5A and 5B, the amplitude of each ADC sample can be in one of 16 states defined by 4 bits (0000 to 1111). To sense the state or amplitude represented by each sample, each 4-bit sample is compared by means of 16 comparators, each comparator having a counter associated therewith and each comparator/counter combination defining a different state or "bin".

c In the embodiment of FIGS. 5A and 5B, there are 16 "bins". Each bin has a comparator and counter, as shown in FIG. 5B with each bin corresponding to a defined amplitude condition. Note that each "bin" in FIG. 5B corresponds to a like numbered bin in FIG. 2.

d When one of the comparators detects a sample which has an amplitude corresponding to the amplitude of that comparator, a signal is produced at the output of that comparator and the count of the counter corresponding to that comparator is increased by one (i.e., incremented).

e At the end of the sampling interval (e.g., after 2,000 samples), a count is taken of the contents of each counter. The information is fed into the processing unit 27, or like controller.

f The processor 27 is programmed to calculate the ratio of the number of samples in each counter to the total number of samples (e.g., 2,000).

g For example, the number of samples in bin 0000 and in bin 1111 may then be compared to the "expected" number which should "ideally" be present according to the histogram. Alternatively, the ratio of the bin contents may be compared as to the ratio in the histogram.

A comparison period is initiated or controlled by means of a "compare" pulse produced by control generator 271, as shown in FIG. 5B. If the ratio (or number of samples) of the received signal in the bins examined by the processing unit 27 is greater than the expected histogram ratio (or number of samples) the gain of the amplifier is decreased. Vice versa, if the ratio (or number of samples) of the received signals in the bins examined by the processing unit 27 is less than the expected histogram ratio (or number of samples), the gain of the amplifier is increased.

For purpose of illustration, the discussion has dealt primarily with the examination and sensing of the first and last bins (0000 and 1111). However, it should be understood that any other set of bins, or all the bins may be sensed and compared. DHC 122 produces an 8-bit output which (see FIG. 3) is coupled via line 123 to an 8-bit digital-to-analog converter (DAC) 124 which may be any one of a number of known DACs. The analog voltage output of DAC 124 is coupled via line 125 to the control input 116 of amplifier 114. This control signal then controls the gain of baseband amplifier 114.

As shown in the circuit of FIG. 3, the quadrature (Q) baseband signal may be processed in a similar manner as the I baseband signal. Thus, the Q signal on output line 104 is applied to the input 133 of an amplifier 134 having an output 138 and a control input 136. The output (Qa) of amplifier 134 is applied to the input of a 4-bit ADC 140 whose output is applied via lines 141 to a dynamic histogram control (DHC) 142. The output of DHC 142 is coupled via line 143 to an 8 bit DAC 144 whose output is coupled via line 145 to the control input 136 of amplifier 134. This loop functions to adjust the gain of the baseband amplifier 134 in a similar manner to that described above, and need not be described anew.

Figure 6A:
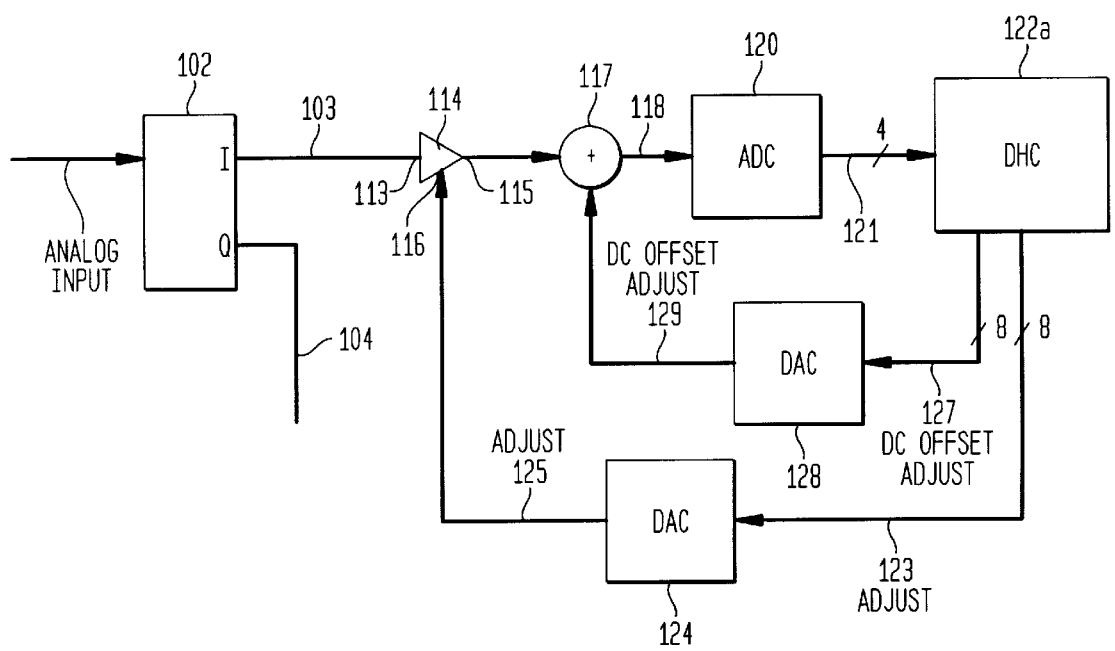
FIG. 6A is a block diagram showing circuitry to provide offset and amplitude adjustments in accordance with this invention.

The histogram also may be used to adjust the symmetry, or lack thereof, of the received signal. This may be accomplished in accordance with the invention by using the histogram to generate a direct current (DC) level offset adjustment, as illustrated in FIGS. 6A and 6B. Referring to FIG. 6A, the output of amplifier 114 is applied to one of two inputs of a summing network 117. The output of summing network 117 is applied to the input of ADC 120 whose output is applied to an input of DHC 122a. DHC 122a of FIG. 6A may be similar to DHC 122 of FIGS. 3 and 5 but also includes the circuitry and programming to perform the functions indicated in FIG. 6B. That is, the processing unit 27 is programmed to compare the contents of one counter (e.g., counter 1) versus a corresponding counter (e.g., counter 16). For the example shown in FIG. 6B, an input of a comparator, comp 1, senses the 0000 amplitude samples at the output of ADC 120 and an input of a comparator, comp 16, senses the 1111 amplitude samples at the output of ADC 120. The output of comp 1 is applied to a counter 1 (CNT 1) and the output of comp 16 is applied to counter 16 (CNT 16). The processing unit 27 is programmed to examine the counts in the first (CNT 1) and last (CNT 16) bins and to compare their contents. For the histogram shown in FIG. 2, the number of samples in the two counters should be nearly equal.

By comparing whether the count of CNT 1 is greater than, equal to or less than the count of CNT 16, the processing unit 27 and DHC 122a produce an 8-bit output direct current (dc) offset control signal on line 127 which is fed to a DAC 128. DAC 128, in turn, produces an output signal which is applied via a line 129 to a second input of summing network 117. The signal on line 129 at the output of DAC 128 functions to adjust the DC level or offset of the amplifier output signal applied to the input of ADC 120. Thus, for example, if the number of samples in the left end section (bin 0000) is higher than the right end section (bin 1111), the 8-bit DAC 128 is used to inject a DC shift via summing point 117 to bring the received signal histogram back to symmetry.

In addition to comparing the output of counter 1 to the output of counter 16, the number of samples in counter 1 and counter 16 are counted, as discussed above, to control the gain of the baseband amplifier. That is, as in FIGS. 3 and 5, the processing unit 27 looks at the sum of the counts in CNT 1 and CNT 16 to determine the ratio of samples in bins 1 and 16 to the total number of samples and, depending on whether the ratio is greater or less than the expected number, supplies a signal on line 123 which is applied to DAC 124 which then produces a gain adjust signal applied on line 125 for appropriately changing (increasing, decreasing or leaving unchanged) the gain of the baseband amplifier.

Figure 8A:
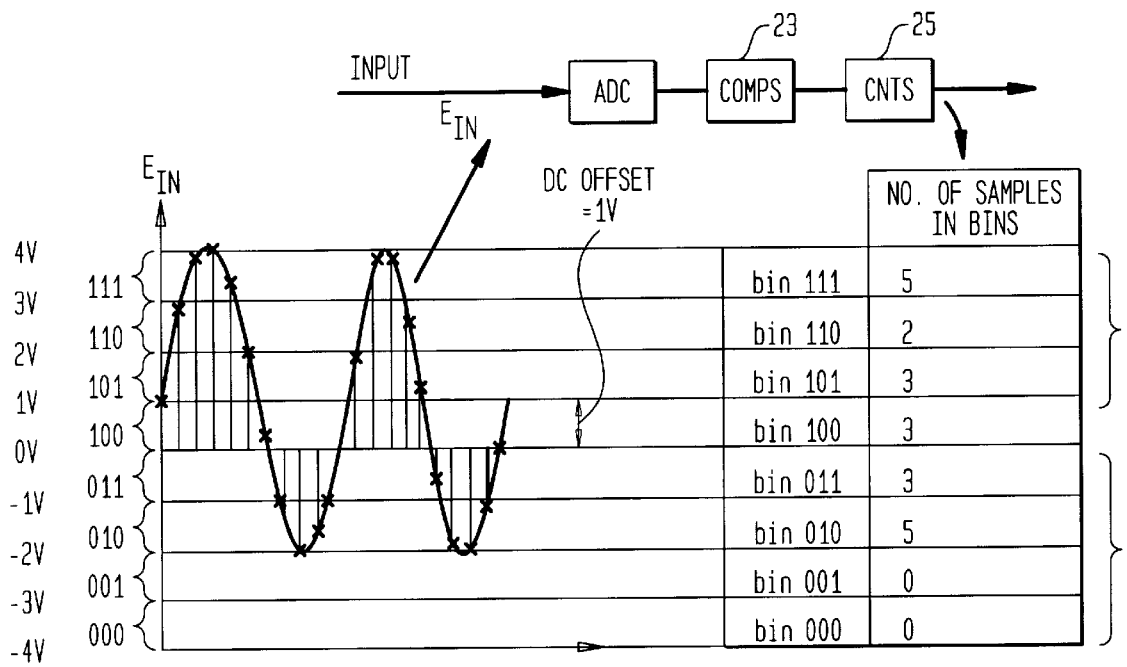
FIGS. 8A and 8B include simplified block and waveform diagrams to illustrate the problem of offset and its solution in accordance with the invention.
Figure 8B:
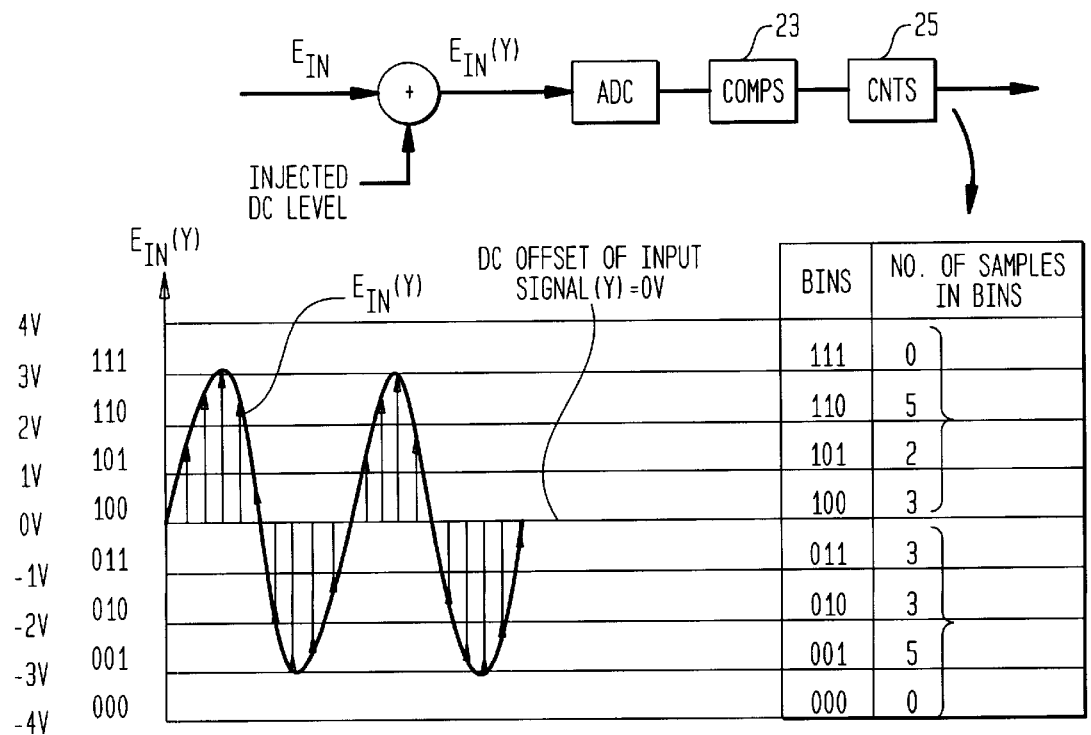

The role and effect of the dc level adjustment may be best explained with reference to FIGS. 8A and 8B, which are simplified idealized representations illustrating the dc offset problem and its solution. In FIG. 8A, an original input signal ($E_{IN}$) is applied to the input of an ADC which samples the input signal. The output of the ADC after being processed by a bank of comparators 23 and a bank of counters 25 will include the number of signal samples in each bin (or within each voltage level). For the example of FIG. 8A, the input signal applied to the input of the ADC is shown varying between 4 volts and −2 volts. For purpose of example, the full amplitude of signals ranging from −4 volts to 4 volts is divided into 8 levels or bins going from 000 to 111. For the input signal $E_{IN}$ shown in FIG. 8A, the samples in each bin at the output of the ADC (and a comparator and comparator bank) would be as shown in FIG. 8A.

It is evident that the results are asymmetrical since bin 111 contains 5 samples while bin 000 contains zero samples. It may also be observed that the asymmetry is due to a dc shift of the input signal $E_{IN}$. For this example, the addition or injection of a −1 Volt dc signal (which amounts to a subtraction) restores a high degree of symmetry to the sampled signals at the output of the ADC. Referring to FIG. 8B, note that by adding (injecting) a −1 V level to the original input signal $E_{IN}$ the waveform $E_{IN}$ (Y) at the output of the summer is shifted downward by one volt, without otherwise altering the amplitude or shape of the signal. However, note that by introducing this shift, the symmetry of the signal is restored. This is evident from FIG. 8B which indicates the output of the ADC after being processed by the bank of comparators 23 and the bank of counters 25. The number of samples in corresponding bins are equal or nearly equal, i.e., the number of samples in bin 111 is equal to the those in bin 000, the number of samples in bin 110 is equal to those in bin 001, the number of samples in bin 101is nearly equal to those in bin 010, and the number of samples in bin 100 is equal to those in bin 011. The purpose of feeding back a level adjust control signal in accordance with the invention is to effectuate this symmetrical type of result.

Figure 7:
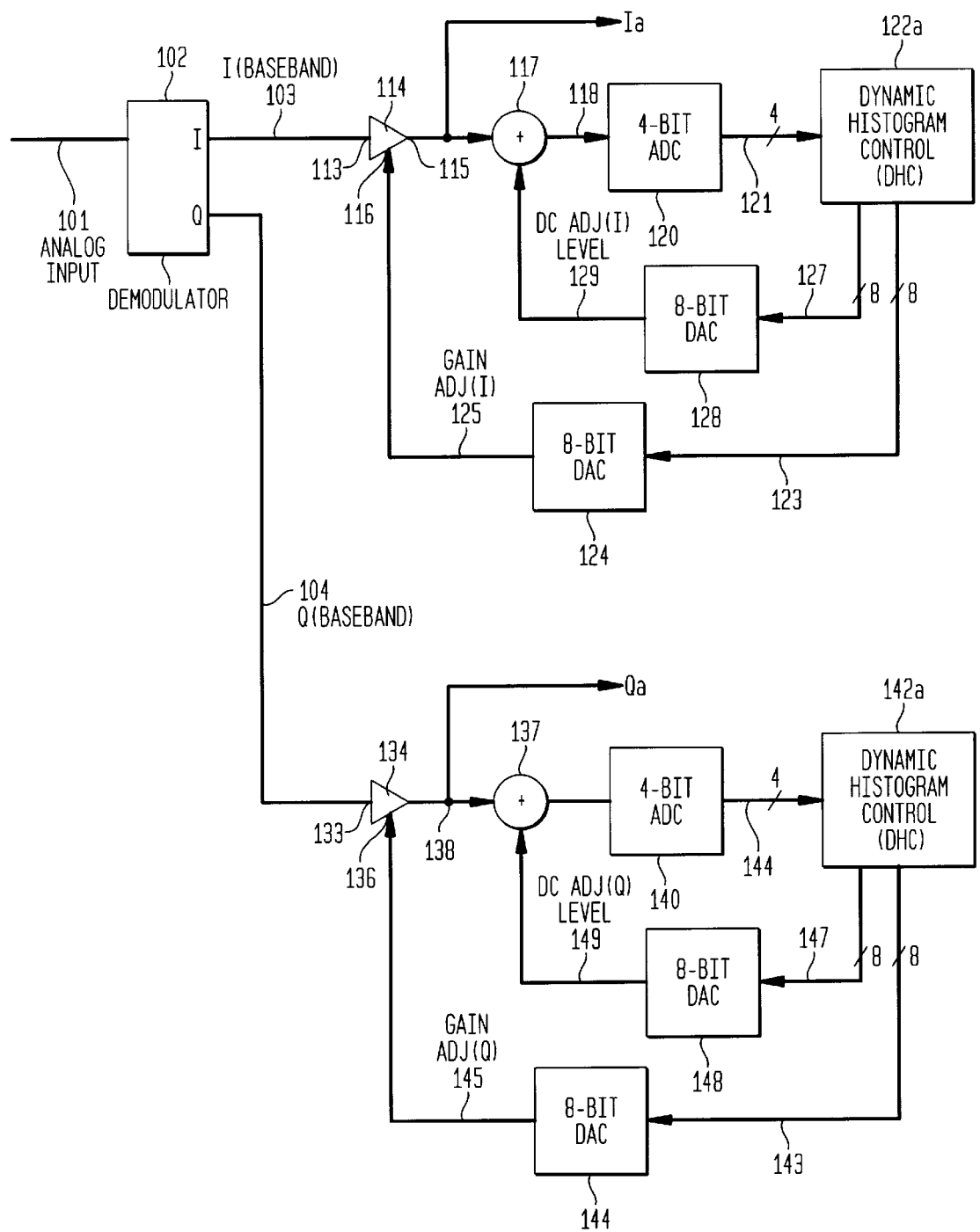
FIG. 7 is a block diagram of a system in accordance with the invention for controlling the gain and offset adjustments of in-phase and quadrature signals.

FIG. 7 shows in block diagram form circuitry to accomplish amplitude (gain) adjustment and symmetry offset adjustment for both an in-phase (I) signal and for a quadrature (Q) signal. The demodulator 102 has an in-phase (I) output and a quadrature (Q) output. The portion of the circuitry to process the I signal has already been described in FIGS. 6A and 6B and need not be repeated. The Q output is applied to circuitry which is essentially identical to the circuitry used to process the I signal. The Q output is applied to the input 133 of a baseband amplifier 134 having an output 138 at which is produced the signal Qa which is applied to one input of a summing network 137. The output of the summing network 137 is applied to the input of a 4 bit ADC 140 whose output is applied to an input of a dynamic control circuit (DHC) 142a. DHC 142a may be similar to the DHC 122a shown in FIG. 6A and produces two outputs; a gain control output which is applied via line 143 to 8-bit DAC 144 and a level control adjust output which is applied via line 147 to an 8-bit DAC 148. The output of DAC 148, applied (or fed back) via a line 149 to summer 137, is a voltage which is used to adjust the DC level and thereby the symmetry of the sampled signal which is produced at the output of summer 137, as described above for FIGS. 6A and 6B. The output of DAC 144 is applied (or fed back) via line 146 to the control input 136 of amplifier 134 to control the gain of baseband amplifier 134, as described above.

In the circuits of FIGS. 3, 5, 6A, 6B and 7, there is a separate DHC circuit associated with each baseband amplifier and each DHC circuit has its own memory circuit. However it should be appreciated that when the I and Q histograms are the same, a single memory circuit containing and storing the histogram may be shared by the DHC circuits in the I and Q loops.

The invention has been illustrated using a CDMA input signal and a histogram generated for a CDMA system. However, it should be appreciated that any system having similar characteristics are suitable for use with the invention.

What is claimed is:

1. A combination comprising:
   an amplifier having an input terminal, an output terminal and a control terminal for the application thereto of a control signal for controlling the gain of the amplifier;
   input means applying an input signal to the input terminal of the amplifier;
   memory means storing a histogram which contains a statistically expected amplitude distribution of the input signal; and
   means responsive to the output of the amplifier and to the contents of the histogram stored in said memory means for comparing the output of the amplifier with the contents of the histogram stored in the memory means for producing a gain control signal which is applied to the control terminal of the amplifier for controlling its gain.

2. A combination as claimed in claim 1, wherein the input signal is a baseband signal which includes signals generated by a code division multiple access (CDMA) system; and
   wherein the amplifier is a baseband amplifier.

3. A combination as claimed in claim 1, wherein the means responsive to the output of the amplifier and to the contents of the histogram includes:
   an analog-to-digital converter (ADC) having an input and an output; and
   means coupling the output of the amplifier to the input of the ADC.

4. A combination as claimed in claim 3, wherein said means responsive to the amplifier output and to the contents of the histogram includes:
   (a) comparator circuit means coupled to the output of the ADC;
   (b) counting means coupled to the comparator circuit means; and
   (c) processing means for processing the information in said counting means and the contents of the histogram for producing said gain control signal.

5. A combination as claimed in claim 4, wherein the means for producing said gain control signal which is applied to the control terminal of the amplifier includes a digital-to-analog converter (DAC) for producing the signal applied to the control terminal of the amplifier.

6. A combination as claimed in claim 3, wherein said means coupling the output of the amplifier to the input of the ADC includes a summing network coupling the signals at the output of the amplifier to the input of the ADC; and
   wherein said means responsive to the output of the amplifier and to the contents of the histogram includes means for producing a level adjust control signal and means for feeding back the level adjust control signal to the summing network for adjusting the direct current (dc) level of the signals coupled between the output of the amplifier and the ADC.

7. A combination as claimed in claim 1, wherein said input means applying the input signal to the input terminal of the amplifier includes a demodulator having an input responsive to a radio frequency (rf) signal and having an in-phase (I) output and having a quadrature (Q) output; and wherein one of said I and Q outputs is applied to the input of said amplifier.

8. A combination as claimed in claim 1, wherein said means responsive to the output of the amplifier and to the contents of the histogram includes:
   a summing network having first and second inputs and an output;
   an analog-to-digital converter (ADC) having an input and an output;
   wherein the output of the amplifier is connected to the first input of the summing network;
   wherein the input of the ADC is connected to the output of the summing network for sampling the amplifier output;
   comparator circuit means coupled to the output of the ADC;
   counting circuit means coupled to the comparator circuit means;
   processing means for processing the information in said counting means with the contents of the histogram for producing a level adjust control signal; and means for feeding back the level adjust control signal to the second input of the summing network for adjusting the direct current (dc) level of the signals coupled between the output of the amplifier and the ADC.

9. A combination as claimed in claim 8 wherein the means for feeding back the level adjust control signal to the summing network includes a digital-to-analog converter (DAC) having an input connected to an output of the processing means and having an output for supplying a control voltage to the summing network.

10. A combination as claimed in claim 8 wherein the comparator circuit means coupled to the output of the ADC includes inputs coupled to the output of the ADC for ascertaining the amplitude of the sampled signals and outputs for producing signals indicative of the amplitude of the sampled signals; and wherein the counting circuitry coupled to the comparator circuit means includes means for counting the number of samples having certain amplitudes.

11. A combination comprising:

an amplifier having an input terminal, an output terminal and a control terminal for the application thereto of a control signal for controlling the gain of the amplifier;

means applying an input signal to the input terminal of the amplifier;

a dynamic histogram control (DHC) circuit including means storing a histogram which contains a statistically expected response of the input signal; and means comparing the output of the amplifier with the contents of the histogram for producing a control signal which is applied to the control terminal of the amplifier for controlling its gain.

12. A combination as claimed in claim 11, wherein the input signal is a baseband input signal and includes signals generated by a code division multiple access (CDMA) system; and wherein the amplifier is a baseband amplifier.

13. A combination as claimed in claim 11, wherein the dynamic histogram control circuit storing the histogram includes a memory circuit for storing the histogram.

14. A combination as claimed in claim 11, wherein the means for comparing the output of the amplifier with the contents of the histogram includes an analog-to-digital converter (ADC) having an input coupled to the output of the amplifier for sampling the signals at the output of the amplifier and having an output which is coupled to the DHC circuit.

15. A combination as claimed in claim 14, wherein the DHC circuit includes comparator circuitry and counting means for comparing the output of the ADC with the contents of the stored histogram.

16. A combination as claimed in claim 15, wherein said means comparing the output of the amplifier for producing the control signal which is applied to the control terminal of the amplifier includes a digital-to-analog converter (DAC) having an input section coupled to an output of the DHC circuit and having an output connected to the control terminal of the amplifier.

17. A combination as claimed in claim 15, wherein said means applying the input signal to the input terminal of the amplifier includes a demodulator having an input responsive to a radio frequency (rf) signal and having an in-phase (I) output and having a quadrature (Q) output; and wherein one of said I and Q outputs is applied to the input of said amplifier.

18. A combination comprising:

an amplifier having an input terminal, an output terminal and a control terminal for the application thereto of a control signal for controlling the gain of the amplifier;

input means applying an input signal to the input terminal of the amplifier;

a dynamic histogram control (DHC) circuit including means storing a histogram which contains a statistically expected response of the input signal;

means coupling the output of the amplifier to the dynamic histogram control (DHC) circuit; and means comparing the output of the amplifier with the contents of the histogram for producing a gain control signal which is applied to the control terminal of the amplifier for controlling its gain.

19. A combination as claimed in claim 18, wherein the input signal is a baseband signal which includes signals generated by a code division multiple access (CDMA) system; and wherein the amplifier is a baseband amplifier.

20. A combination as claimed in claim 18, wherein the dynamic histogram control circuit storing the histogram includes a memory circuit for storing the histogram.

21. A combination as claimed in claim 18, wherein the means coupling the output of the amplifier to the dynamic histogram control (DHC) circuit includes an analog-to-digital converter (ADC) having an input coupled to the output of the amplifier for sampling the signals at the output of the amplifier and having an output which is coupled to the DHC circuit.

22. A combination as claimed in claim 21, wherein the DHC circuit includes comparator and counting circuitry coupled to the output of the ADC and processing means for comparing the output of the comparator and counting circuitry with the stored histogram.

23. A combination as claimed in claim 22, wherein said means for producing a control signal which is applied to the control terminal of the amplifier includes a digital-to-analog converter (DAC) having an input section coupled to an output of the DHC circuit and having an output connected to the control terminal of the amplifier.

24. A combination as claimed in claim 18, wherein said input means applying the input signal to the input terminal of the amplifier includes a demodulator having an input responsive to a radio frequency (rf) signal and having an in-phase (I) output and having a quadrature (Q) output; and wherein one of said I and Q outputs is applied to the input of said amplifier.

25. A combination as claimed in claim 18, wherein said means coupling the output of the amplifier to the DHC circuit includes a summing network coupling the output of the amplifier to the input of an analog-to-digital converter (ADC); and wherein said means comparing the output of the amplifier with the contents of the histogram includes means for comparing the output of the ADC with the contents of the histogram for producing a second control signal and means for feeding back the second control signal to the summing network for adjusting the direct current (dc) level of the signals coupled between the output of the amplifier and the input of the ADC.

26. A combination as claimed in claim 18, wherein said means coupling the output of the amplifier to the dynamic histogram control circuit includes:

a summing network having first and second inputs and an output;

an analog-to-digital converter (ADC) having an input and an output;

wherein the output of the amplifier is connected to the first input of the summing network;

wherein the input of the ADC is connected to the output of the summing network for sampling the amplifier output;

wherein the output of the ADC is coupled to an input of the DHC circuit for supplying sampled signals thereto; and wherein said means comparing the output of the amplifier with the contents of the histogram includes means for producing a second control signal and means for feeding back the second control signal to the second input of the summing network for adjusting the direct current (dc) level of the signals coupled between the output of the amplifier and the ADC.

27. A combination as claimed in claim 26 wherein the means for feeding back the control signal to the summing network includes a digital-to-analog converter (DAC) having an input connected to an output of the DHC and having an output for supplying a direct current (dc) voltage to the summing network.

28. A combination as claimed in claim 26 wherein the dynamic histogram control circuit includes:

comparator circuitry having an input coupled to the output of the ADC for ascertaining the amplitude of the sampled signals and having an output for producing signals indicative of the amplitude of the sampled signals; and counter circuitry coupled to the output of the comparator circuitry for counting the number of samples having certain amplitudes.

29. A combination as claimed in claim 28 wherein the DHC also includes a memory circuit for storing the histogram and processing and control circuitry for performing calculations and comparisons of sampled signals versus histogram information.

30. A combination comprising:

an amplifier having an input terminal, an output terminal and a control terminal for the application thereto of a control signal for controlling the gain of the amplifier;

input means applying a baseband input signal to the input terminal of the amplifier;

an analog-to-digital converter (ADC) having an input and an output for sampling the signals at the output of the amplifier and producing sampled signals corresponding thereto at the output of the ADC;

means coupling the input of the ADC to the output of the amplifier;

means for coupling the output of the ADC to a dynamic histogram control (DHC) circuit, said DHC circuit including means for storing a histogram which contains a statistically expected response of the baseband input signal; said DHC also including circuitry for comparing the sampled signals with the histogram for producing a gain control signal and a level adjustment control signal;

means applying the gain control signal to the control terminal of the amplifier for controlling its gain; and means applying the level adjustment control signal to the means coupling the output of the amplifier to the input of the ADC for controlling the level of the sampled signals.

31. A combination as claimed in claim 30 wherein the means coupling the output of the amplifier to the input of the ADC includes a summing network having a first input coupled to the output of the amplifier, a second input for receiving a signal corresponding to the level adjustment control signal and an output coupled to the input of the ADC.

* * * * *